United States Patent
Kamii et al.

(10) Patent No.: US 10,048,853 B2
(45) Date of Patent: Aug. 14, 2018

(54) ELECTRONIC DEVICE AND DISPLAY CONTROL METHOD

(71) Applicant: KYOCERA Corporation, Kyoto-shi, Kyoto (JP)

(72) Inventors: Toshihiro Kamii, Osaka (JP); Atsushi Suzuki, Nishinomiya (JP); Keisuke Nagata, Kobe (JP)

(73) Assignee: KYOCERA Corporation, Kyoto (JP)

( * ) Notice: Subject to any disclaimer, the term of this patent is extended or adjusted under 35 U.S.C. 154(b) by 125 days.

(21) Appl. No.: 14/866,602

(22) Filed: Sep. 25, 2015

(65) Prior Publication Data

US 2016/0018964 A1    Jan. 21, 2016

Related U.S. Application Data

(63) Continuation of application No. PCT/JP2014/058882, filed on Mar. 27, 2014.

(30) Foreign Application Priority Data

Mar. 27, 2013   (JP) .................................. 2013-065591

(51) Int. Cl.
*G06F 3/0485* (2013.01)
*G06F 3/0488* (2013.01)
(Continued)

(52) U.S. Cl.
CPC .......... *G06F 3/0485* (2013.01); *G06F 3/0488* (2013.01); *G09G 3/20* (2013.01);
(Continued)

(58) Field of Classification Search
CPC .... G09G 3/20; G09G 2320/0626; G09G 5/34; G09G 2354/00; G09G 2330/022; G09G 3/3406; G06F 3/0488; G06F 3/0485
See application file for complete search history.

(56) References Cited

U.S. PATENT DOCUMENTS

| | | | | |
|---|---|---|---|---|
| 2008/0218535 | A1* | 9/2008 | Forstall ................. | G06F 1/3203 345/690 |
| 2010/0235664 | A1* | 9/2010 | Karlsson ............... | G06F 1/3228 713/323 |
| 2012/0137217 | A1* | 5/2012 | Amsterdam .......... | G06F 1/3228 715/256 |

FOREIGN PATENT DOCUMENTS

JP    2002-123231 A    4/2002

OTHER PUBLICATIONS

International Search Report dated Jun. 10, 2014, issued for International Application No. PCT/JP2014/058882.

* cited by examiner

*Primary Examiner* — Abhishek Sarma
(74) *Attorney, Agent, or Firm* — Procopio Cory Hargreaves and Savitch LLP

(57) ABSTRACT

When a screen displayed on a display includes a scrollable scroll region, and a first condition is satisfied which defines that the scroll region is not scrolled to a scroll position at which the last part of the displayed content in the scroll region is displayed on a display, a control module executes a first control of setting a time limit to be longer as compared to a case where the screen does not include the scroll region or not darkening or turning off the display based on the time limit. On the other hand, when a screen displayed on the display includes a scroll region, and the first condition is not satisfied, the control module executes a second control of setting the time limit to be shorter as compared to the first control or darkening or turning off the display based on the time limit.

3 Claims, 16 Drawing Sheets

(51) Int. Cl.
*G09G 3/20* (2006.01)
*G09G 5/34* (2006.01)
(52) U.S. Cl.
CPC ....... *G09G 5/34* (2013.01); *G09G 2320/0626* (2013.01); *G09G 2330/022* (2013.01); *G09G 2354/00* (2013.01)

FIG.5
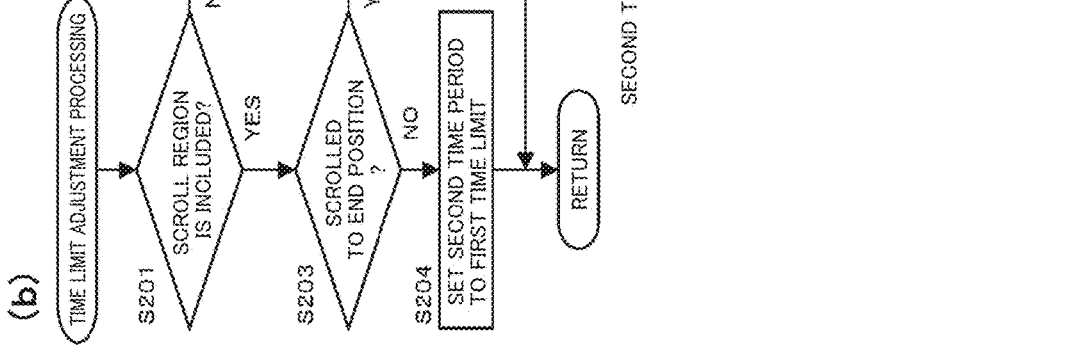
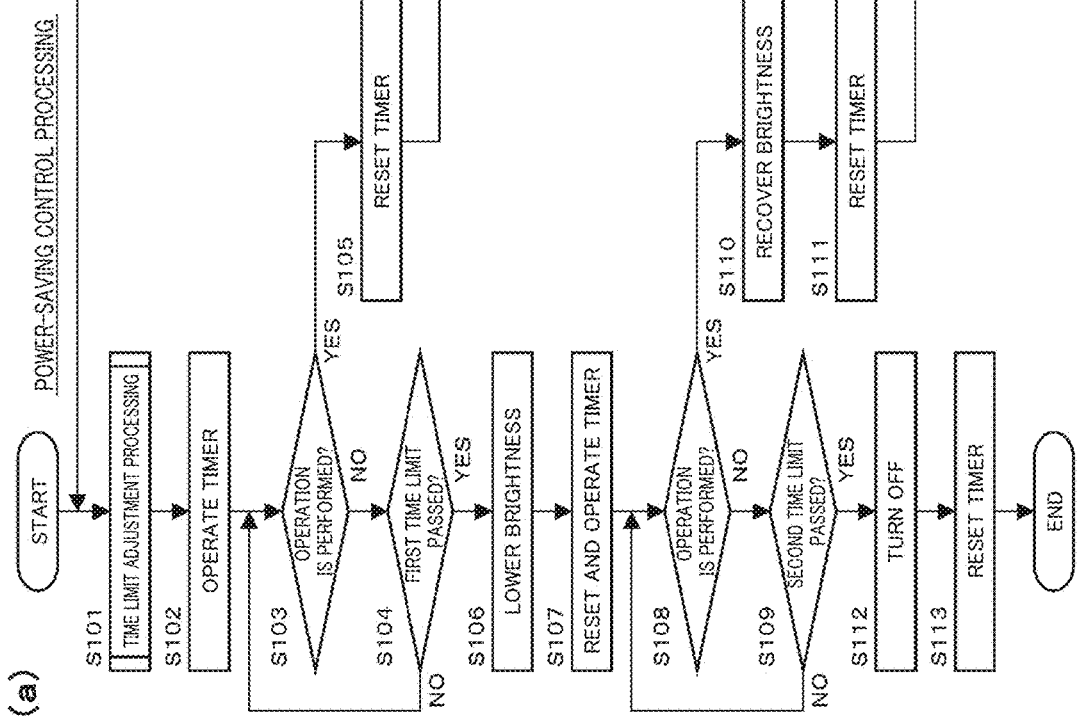

FIG.7
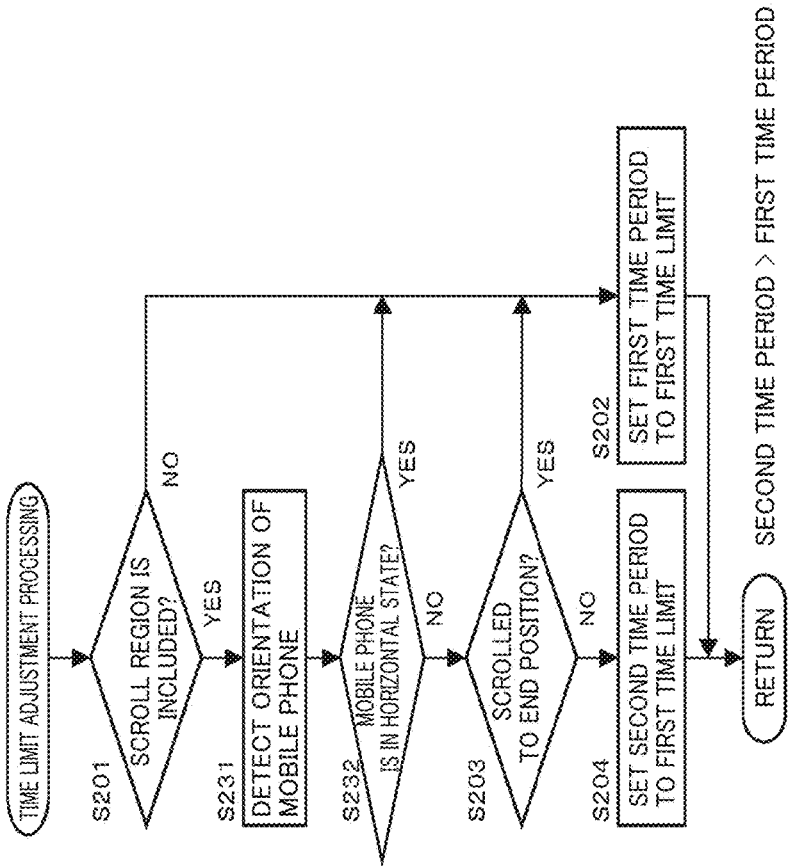
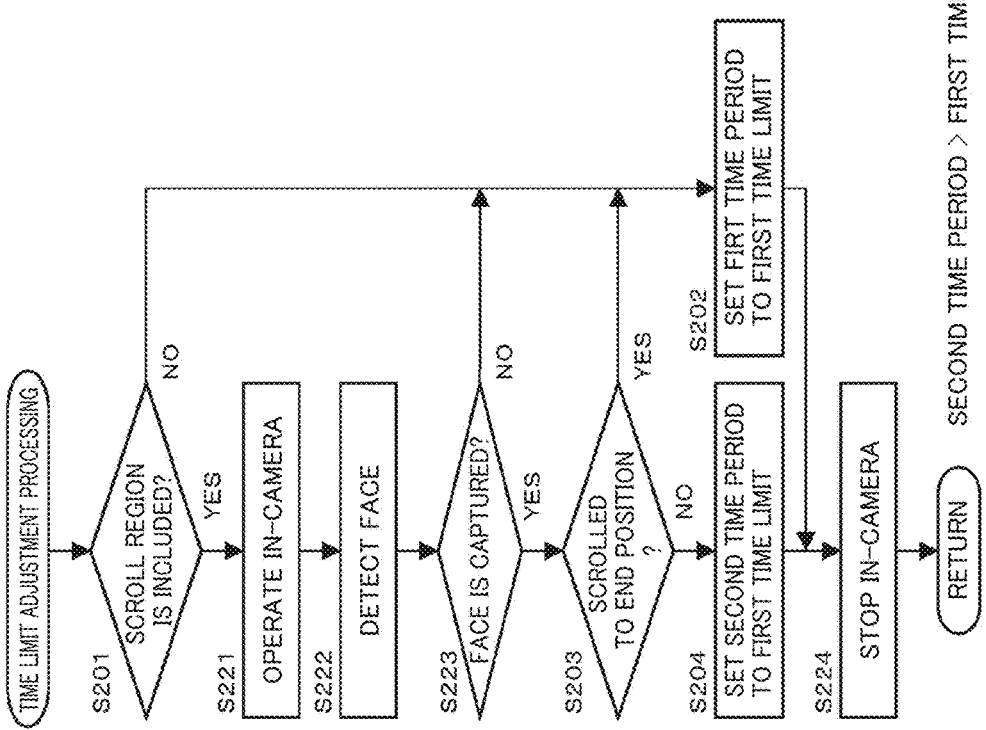

FIG.14
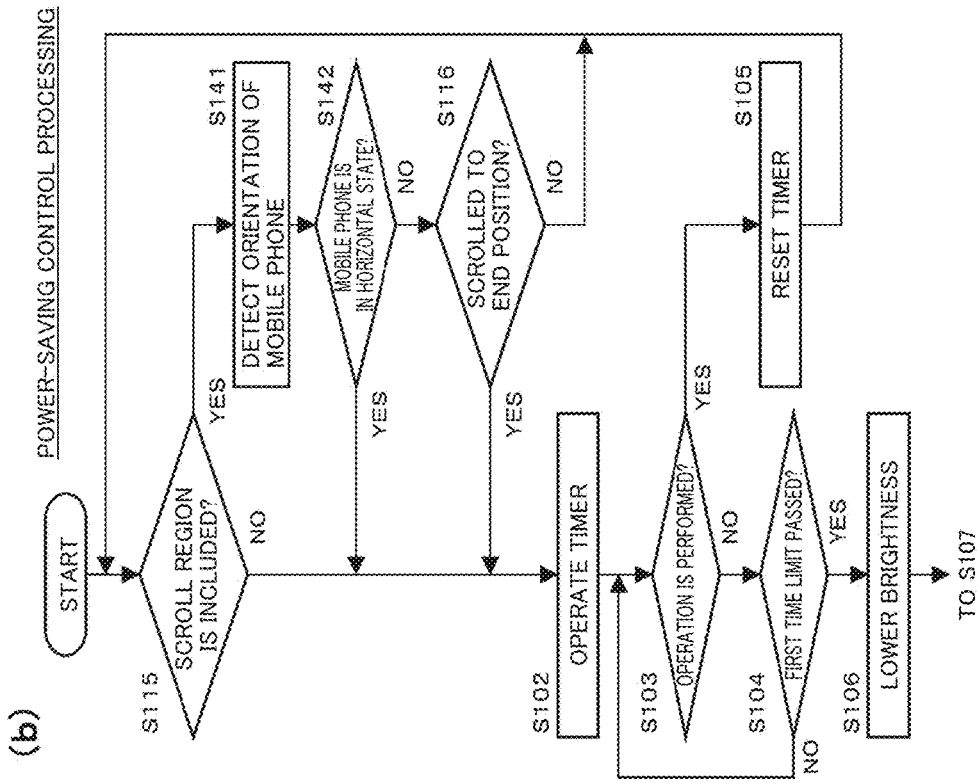
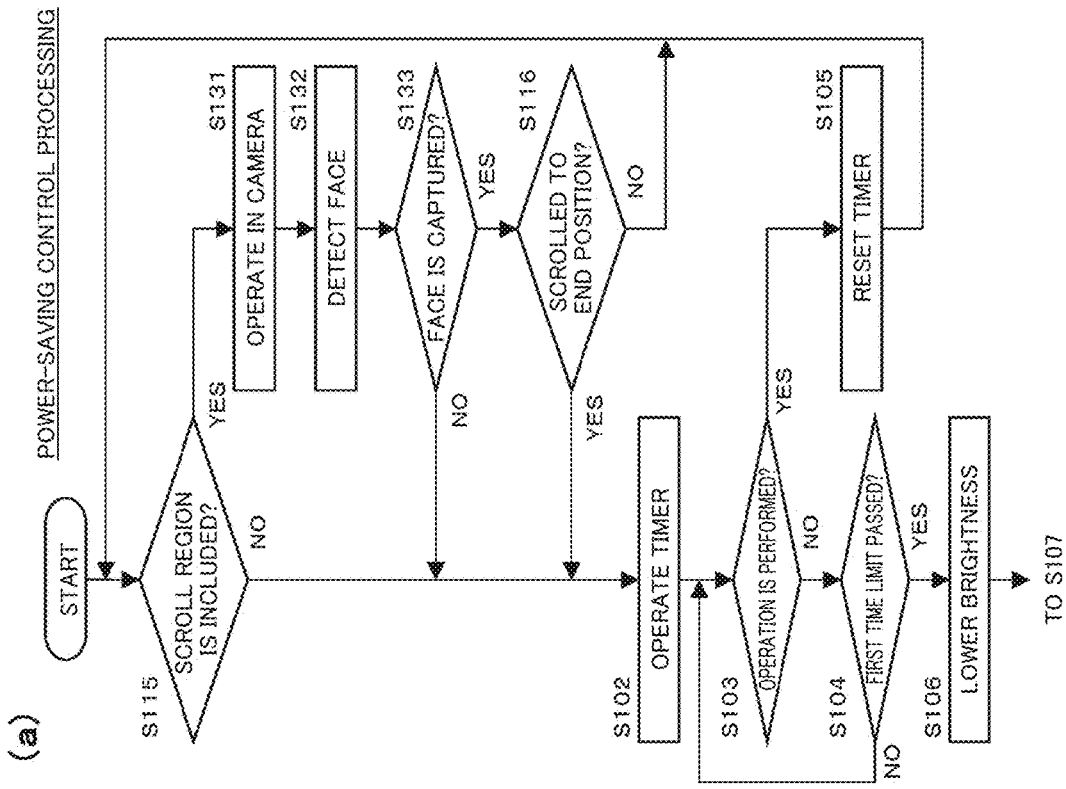

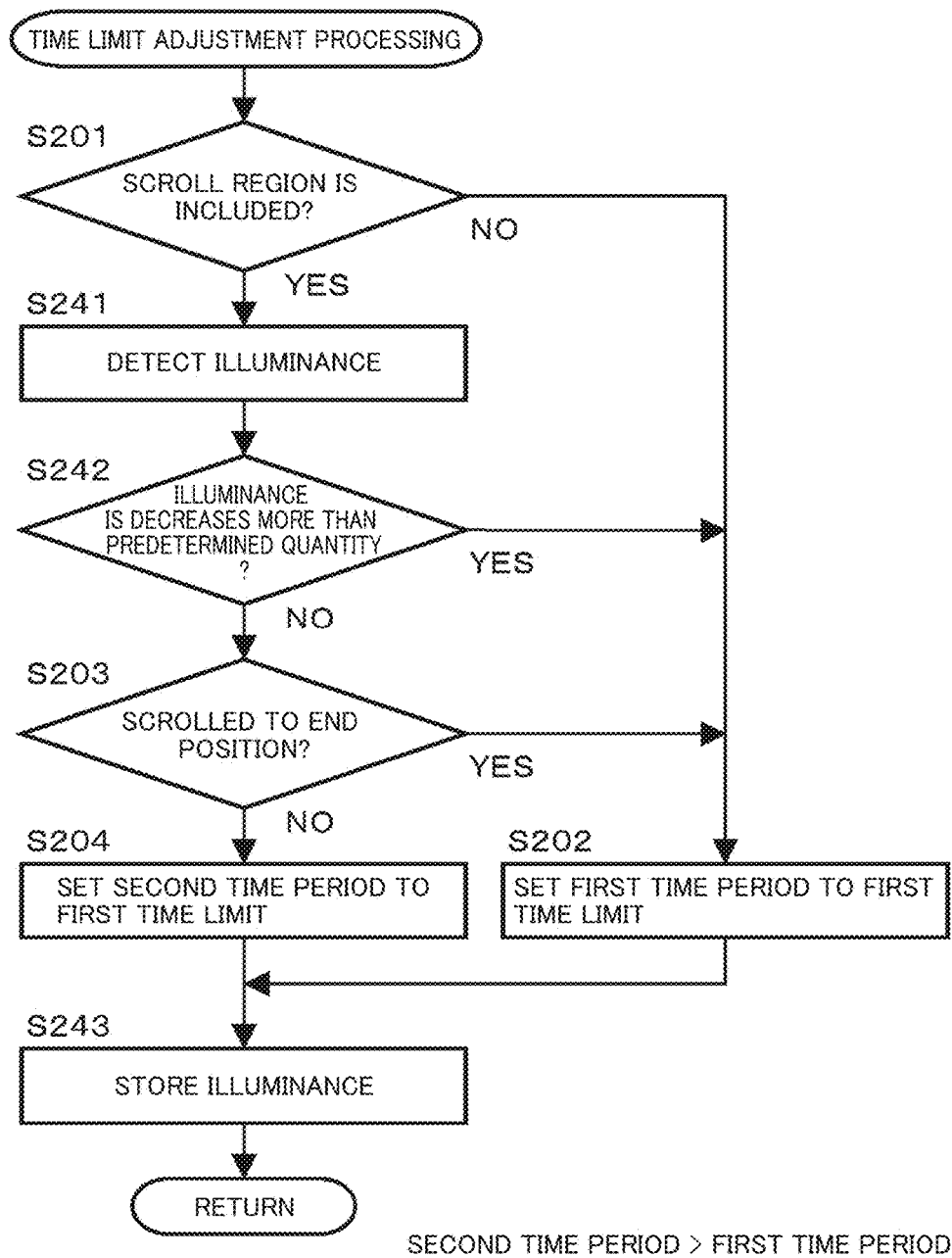

ELECTRONIC DEVICE AND DISPLAY CONTROL METHOD

CROSS-REFERENCE TO RELATED APPLICATION

The present application is a continuation of international application PCT Application No. PCT/JP2014/058882 filed on Mar. 27, 2014, entitled "Electronic Device and Display Control Method", which claims the benefit of Japanese Application No. 2013-065591 filed on Mar. 27, 2013 entitled "Electronic Device and Display Control Method". The disclosures of the above applications are each incorporated by reference herein.

FIELD

The present disclosure relates to electronic devices such as a mobile phone, a personal computer, a PDA (Personal Digital Assistant), a tablet PC, a music player, a navigation system, an electronic book terminal, and the like. Moreover, the present disclosure relates to a display control method suitable for use in the electronic devices.

BACKGROUND

Conventionally, in an electronic device provided with a display, a display is darkened or turned off when a time period of not operating an electronic device exceeds a predetermined time limit, so that power consumption is suppressed. For example, a configuration of adjusting a time limit in accordance with the number of characters of a document such as an electronic mail may be employed.

SUMMARY

An electronic device according to a first embodiment of the present disclosure includes a display module, an operation receiving module configured to receive an operation, and a controller configured to darken or turn off the display module based on an event that a time period of not receiving an operation through the operation receiving module exceeds a time limit Here, when a screen displayed on the display module includes a scrollable region and a first condition is satisfied, the controller configured to execute a first control of setting the time limit to be longer as compared to a case where the screen does not include the scrollable region or not darkening and turning off the display module based on the time limit, the first condition defining that the scrollable region is not scrolled to a scroll position where a last portion of a displayed content in the scrollable region is displayed on the display module. On the other hand, when the screen includes the scrollable region, and the first condition is not satisfied, the controller configured to execute a second control of setting the time limit to be shorter as compared to the first control or darkening or turning off the display module based on the time limit.

A second embodiment of the present disclosure relates to a display control method for an electronic device including a display module and an operation receiving module configured. The display control method according to the present disclosure includes the steps of displaying a scrollable region on the display module, the display module being darkened or turned off based on an event that a time period of not receiving an operation through the operation receiving module exceeds a time limit, when a first condition is satisfied, executing a first control of setting the time limit to be longer as compared to a case where said screen does not include the scrollable region or not darkening or turning off the display module based on the time limit, the first condition defining that the scroll region is not scrolled to a scroll position at which a last portion of a displayed content in the scrollable region is displayed on the display module, and when the first condition is not satisfied, executing a second control of setting the time limit to be shorter as compared to the first control or darkening or turning off the display module based on the time limit.

The effect and significance of the present disclosure will be more apparent in accordance with the following description of the embodiments. However, the embodiments are merely examples of implementing the present disclosure, and the present disclosure is not limited by the description of the following embodiments.

BRIEF DESCRIPTION OF THE DRAWINGS

FIG. 5 is a flowchart representing a power-saving control processing.

FIG. 7 is a flowchart representing a time limit adjustment processing.

FIG. 14 is a flowchart representing a power-saving control processing.

FIG. 16 is a flowchart representing a time limit adjustment processing.

DETAILED DESCRIPTION

In an electronic device including a display, it is desirable to have a long time of displaying a document on a display in order to improve a convenience for a user. However, in order to reduce power consumption, it is desirable not to have a long time of displaying a document on a display when a user has finished browsing a document.

Therefore, an electronic device and a display control method are desired which can favorably improve the convenience for a user and reduce the power consumption.

In the following, embodiments of the present disclosure will be described with reference to the drawings.

Figure 1:
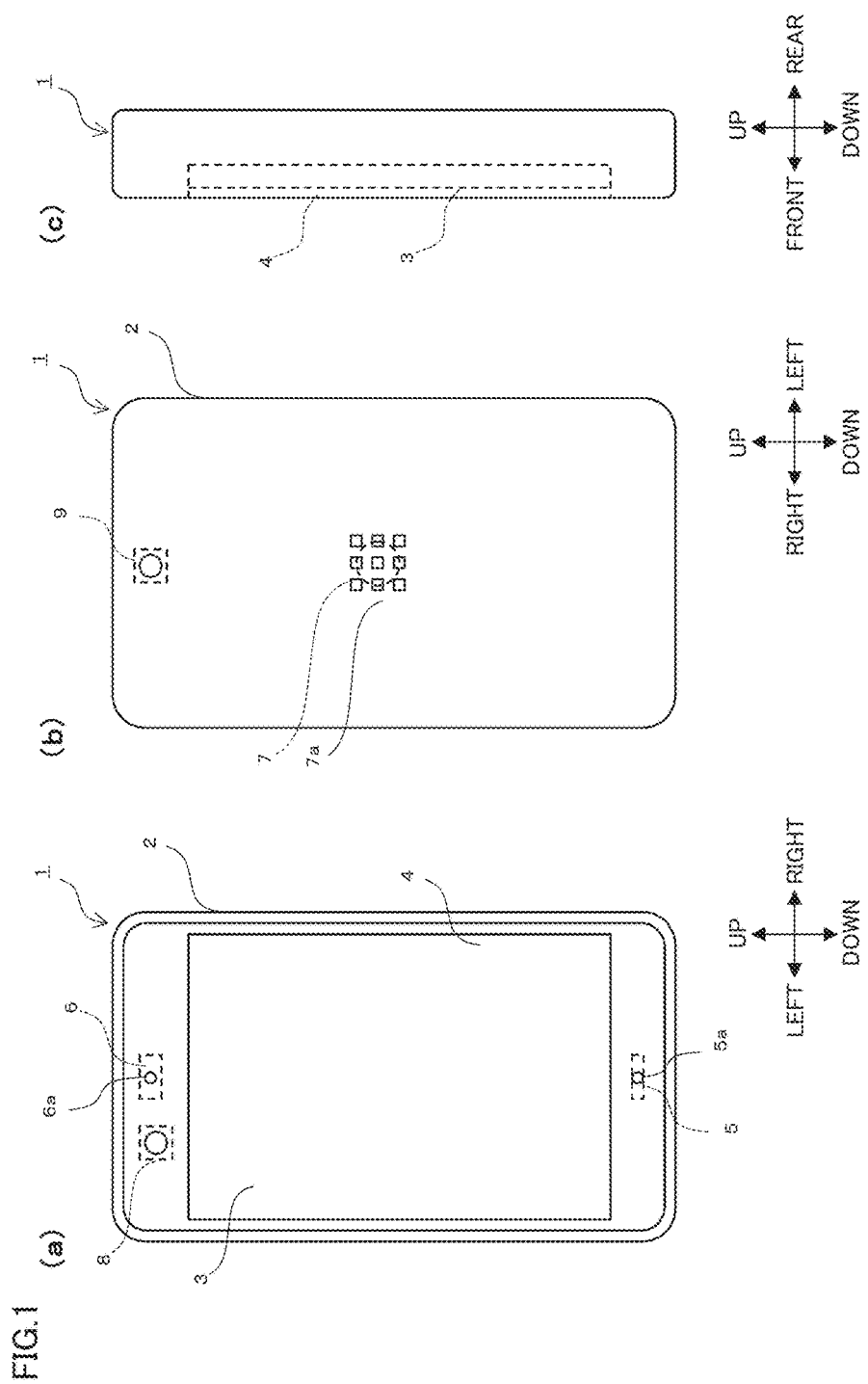
FIG. 1 represents a configuration of a mobile phone.

FIGS. 1(*a*), 1(*b*), and 1(*c*) are a front view, a rear view, and a side view of mobile phone 1, respectively. In the following, for convenience of description, as shown in FIGS. 1(*a*)

to 1(c), a longitudinal direction of a cabinet 2 is defined as an upward/downward direction, and a short direction of cabinet 2 is defined as a leftward/rightward direction.

As shown in FIG. 1, mobile phone 1 includes cabinet 2, a display 3, a touch panel 4, a microphone 5, a phone call speaker 6, and an external speaker 7.

Cabinet 2 may be a substantially rectangular contour when viewed from a front face. Display 3 is on a front side of cabinet 2. Display 3 can display various images (screens). Display 3 includes, for example, a liquid crystal display. Display 3 may be other kind of display such as an organic electroluminescence display. Further, touch panel 4 is located so as to cover display 3. Touch panel 4 may be a transparent sheet. As touch panel 4, a touch panel of various types such as an electrostatic capacity type, an ultrasonic wave type, a pressure-sensitive type, a resistance film type, an optical detection type, and the like may be used.

In cabinet 2, microphone 5 is located at a lower end portion. Moreover, in cabinet 2, phone call speaker 6 is located at an upper end portion. Microphone 5 can receive a voice which has passed through microphone hole 5a in the front side of cabinet 2. Microphone 5 can generate an electric signal in accordance with inputted sound. Phone call speaker 6 can output sound. The outputted sound passes through an output hole 6a in the front side of cabinet 2 and discharged to outside of cabinet 2. At the time of making a phone call, a received phone call voice from a communicated device (a mobile phone or the like) is outputted from phone call speaker 6, and uttered voice given by a user is inputted to microphone 5. It should be noted that sound includes various sounds such as voice, informing sound, and the like.

In cabinet 2, external speaker 7 is located. On a back side of cabinet 2, output holes 7a are located in a region opposite to external speaker 7. Sound outputted from external speaker 7 passes through output holes 7a and is outputted to outside of cabinet 2.

In an upper portion of cabinet 2, an in-camera 8 is located on the front side, and an out-camera 9 is located on a back side. In-camera 8 can capture an image of a photographic object which is present in a forward direction of mobile phone 1. Out-camera 9 can capture an image of a photographic object which is present in a backward direction of mobile phone 1.

Figure 2:
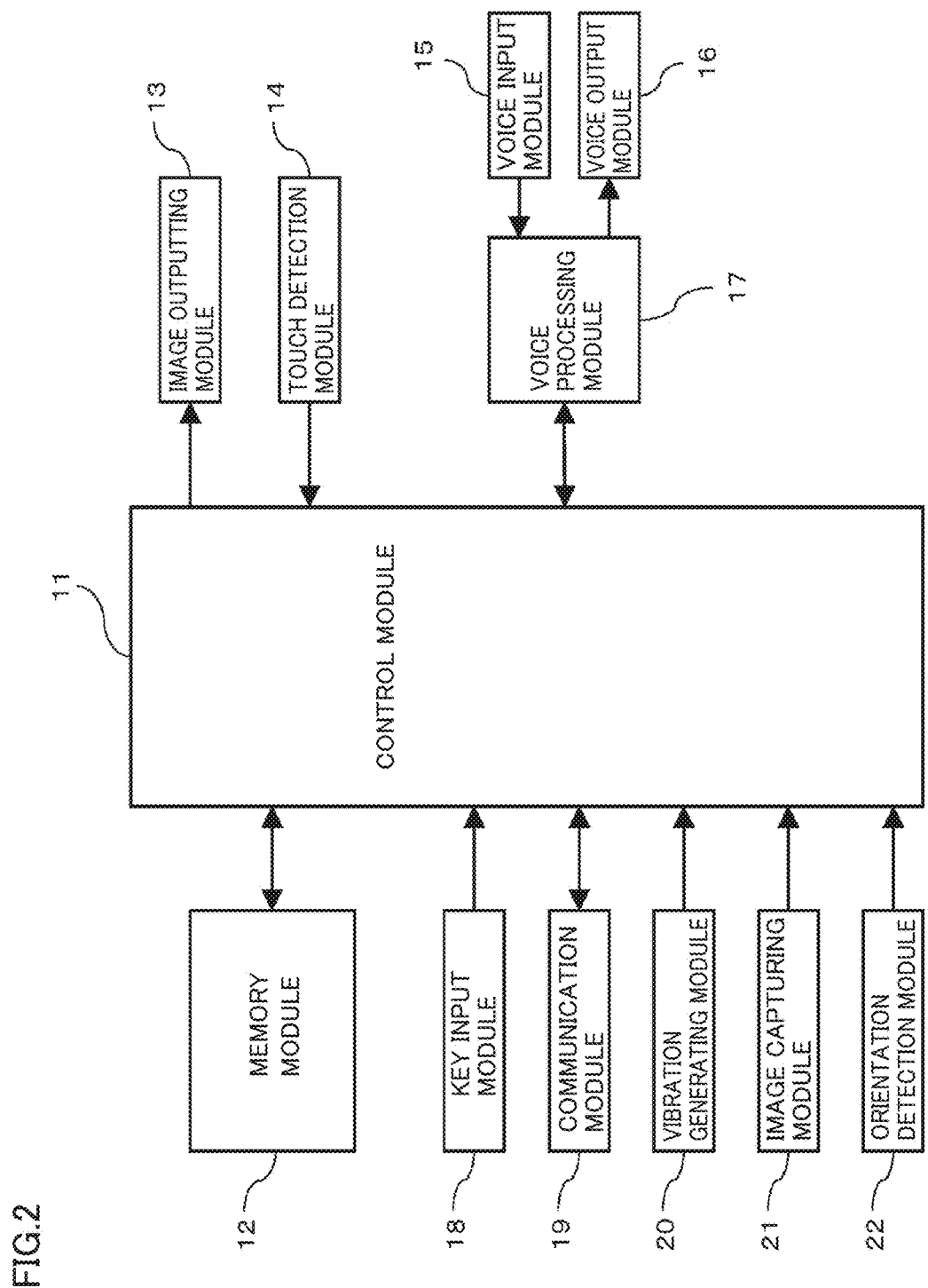
FIG. 2 is a block diagram representing an overall configuration of the mobile phone.

FIG. 2 is a block diagram representing an overall configuration of mobile phone 1.

As shown in FIG. 2, mobile phone 1 includes a control module 11, a memory module 12, an image outputting module 13, a touch detection module 14, an voice input module 15, voice output module 16, a voice processing module 17, a key input module 18, a communication module 19, a vibration generating module 20, an image capturing module 21, and an orientation detection module 22.

Memory module 12 includes an ROM, an RAM, and an external memory. Memory module 12 can store various programs. The programs stored in memory module 12 include a control program configured to control each portion of mobile phone 1 and various applications (for example, a home, a phone, an electronic mail, a web browser, a map, a game, a schedule management, and the like). The programs may be stored in memory module 12 at the time of manufacturing mobile phone 1 by a manufacturer, and stored in memory module 12 through a communication network or a storage medium such as a memory card, a CD-ROM, or the like.

Memory module 12 also may include a working area configured to store data which is temporarily used or generated at the time of executing a program.

Control module 11 includes a CPU. Control module 11 can control each portion (memory module 12, image outputting module 13, touch detection module 14, voice input module 15, voice output module 16, voice processing module 17, key input module 18, communication module 19, vibration generating module 20, image capturing module 21, orientation detection module 22, and the like) constituting mobile phone 1 in accordance with programs stored in memory module 12.

Image outputting module 13 includes display 3 shown in FIG. 1. Image outputting module 13 can display an image (screen) on display 3 based on a control signal and an image signal from control module 11. Moreover, image outputting module 13 can turn on, turn off, and adjust a brightness of display 3 in accordance with a control signal from control module 11.

Touch detection module 14 includes touch panel 4 shown in FIG. 1, and can detect a touch operation with respect to touch panel 4. More specifically, touch detection module 14 can detect a contact position (hereinafter, referred to as "touch position") of a contact object such as a finger or the like of a user with respect to touch panel 4. Touch detection module 14 can output to control module 11 a position signal generated based on the detected touch position.

Providing touch panel 4 allows a user to perform various touch operations by touching touch panel 4 with a finger. Touch operations include, for example, a tap operation, a flick operation, a slide operation, and the like. The tap operation is an operation in which a user touches touch panel 4 with a finger and releases the finger from touch panel 4. The flick operation is an operation in which a user touches touch panel 4 with a finger and flicks touch panel 4 with the finger in any direction. The slide operation is an operation in which a user holds a finger being touched to touch panel 4 and moves it in any direction.

For example, when touch detection module 14 detects a touch position, and a touch position is not further detected within a predetermined first time period after the detection of the touch position, control module 11 determines the touch operation as a tap operation. When a touch position is moved by a distance longer than or equal to a predetermined first distance within a predetermined second time period from the detection of the touch position, and thereafter the touch position is not detected, control module 11 determines that the touch operation is a flick operation. After the touch position is detected, when the touch position is moved by a distance longer than or equal to a predetermined second distance, control module 11 determines that the touch operation is a slide operation.

Voice input module 15 includes microphone 5. Voice input module 15 can output an electric signal from microphone 5 to voice processing module 17.

Voice output module 16 includes phone call speaker 6 and external speaker 7. An electric signal from voice processing module 17 is inputted to voice output module 16. Voice output module 16 can output sound from phone call speaker 6 or external speaker 7.

Voice processing module 17 can apply an A/D conversion and the like to an electric signal from voice input module 15 and can output the converted digital voice signal to control module 11. Voice processing module 17 can apply a decoding processing, a D/A conversion, and the like to a digital voice signal from control module 11 and output the converted electric signal to voice output module 16.

Key input module 18 includes at least one hard key. For example, key input module 18 includes a power supply key and the like configured to turn on the power of mobile phone 1. Key input module 18 can output to control module 11 a signal corresponding to the pressed hard key.

Communication module 19 includes a circuit configured to convert a signal, an antenna configured to communicate an electric wave, and the like to make a phone call and perform a communication. Communication module 19 can convert a signal for a phone call and a communication inputted from control module 11 into a wireless signal and can transmit the converted wireless signal to a destination such as a base station or other communication device through the antenna. Further, communication module 19 can convert the wireless signal which is received through the antenna into a signal in the form which can be used by control module 11 and can output the converted signal to control module 11.

Vibration generating module 20 includes a vibrator. Vibration generating module 20 allows the vibrator to vibrate based on a control signal from control module 11. The vibration of the vibrator is transmitted to cabinet 2, so that cabinet 2 is vibrated.

Image capturing module 21 includes in-camera 8 shown in FIG. 1(*a*) and out-camera 9 shown in FIG. 1(*b*). Image capturing module 21 can apply various image processing to image data of images captured by in-camera 8 and out-camera 9 and can output the image data subjected to the image processing to control module 11.

Orientation detection module 22 includes a triaxial accelerometer and the like. The triaxial accelerometer can detect a gravitational acceleration applied to mobile phone 1 in the forward/backward direction, leftward/rightward direction, and upward/downward direction. Orientation detection module 22 can detect an orientation of mobile phone 1 based on a detection result of the triaxial accelerometer and can output a detection signal in accordance with the detected orientation of mobile phone 1 to control module 11. For example, when mobile phone 1 is placed on a desk, and mobile 1 is retained in a horizontal state (in a state where display 3 is oriented in a vertical direction), orientation detection module 22 can output a detection signal corresponding to the horizontal state. When mobile phone 1 is held by a user so as to be oriented in a vertical direction (a direction in which a longitudinal direction of cabinet 2 is along the vertical direction), orientation detection module 22 can output a detection signal corresponding to the vertical direction. When mobile phone 1 is held by a user so as to be oriented in a lateral direction (a direction in which a longitudinal direction of cabinet 2 is along the horizontal direction), orientation detection module 22 can output a detection signal corresponding to the lateral direction.

When various applications are executed by control module 11, an execution screen thereof is displayed on display 3. The execution screen may include a scrollable scroll region.

Figure 3:
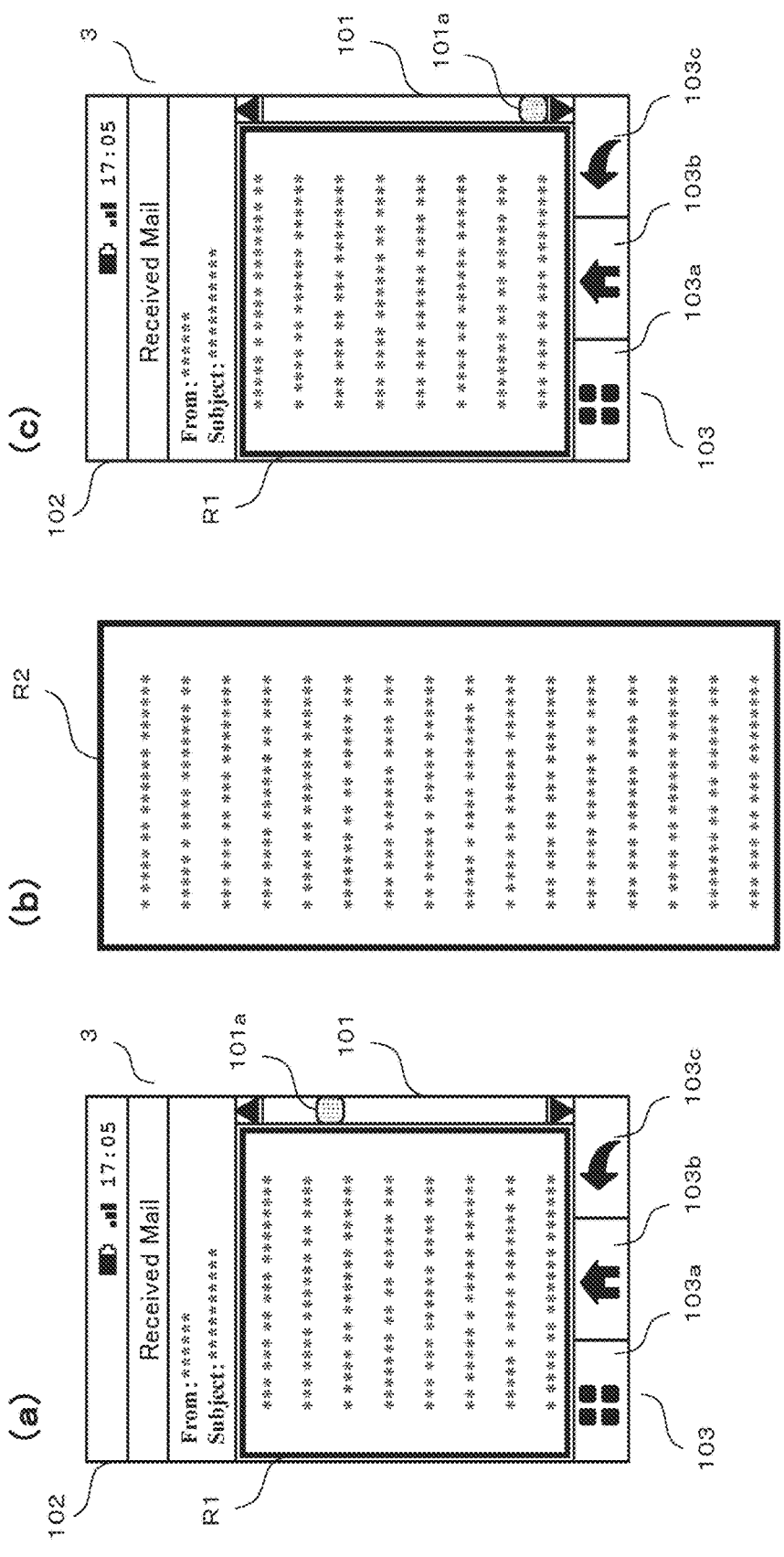
FIG. 3 represents an example in which a mail browsing screen including a scrollable mail main body is displayed on a display.

FIG. 3 represents an example in which a mail browsing screen including a scrollable mail main body is displayed on display 3. For example, as shown in FIGS. 3(*a*) and 3(*b*), when a size of a screen region R2 required to display an entire mail main body is larger in the upward/downward direction than a size of a screen region R1 allocated to display the mail main body in the mail browsing screen, control module 11 sets screen region R1 displaying the mail main body to be a scroll region. Screen region R1 which is a scroll region, in other words, the mail main body displayed in screen region R1 becomes scrollable in the upward/downward direction. Control module 11 can display a scroll bar 101 on the right side of screen region R1. It should be noted that, for convenience in description, scroll regions R1 and R2 are indicated by bold frames in FIG. 3.

Control module 11 can receive a scroll operation for scrolling screen region R1. The scroll operation includes a drag operation in the upward/downward direction with respect to a knob 101*a* of scroll bar 101, and a flick or slide operation in the upward/downward direction with respect to screen region R1. When knob 101*a* is moved downward by the drag operation, control module 11 can move the mail main body upward and can allow screen region R1 to display a lower portion which is provided before the movement. Also when the flick or slide operation in the upward direction is performed, control module 11 moves the mail main body upward and allows screen region R1 to display a lower portion which is provided before the movement. As shown in FIG. 3(*c*), when screen region R1 is scrolled to an end position, the last portion of the mail main body is displayed on display 3. Control module 11 does not receive further scroll operation in the direction of moving the main body upward. At this time, knob 101*a* is located at a lower end of scroll bar 101.

Figure 4:
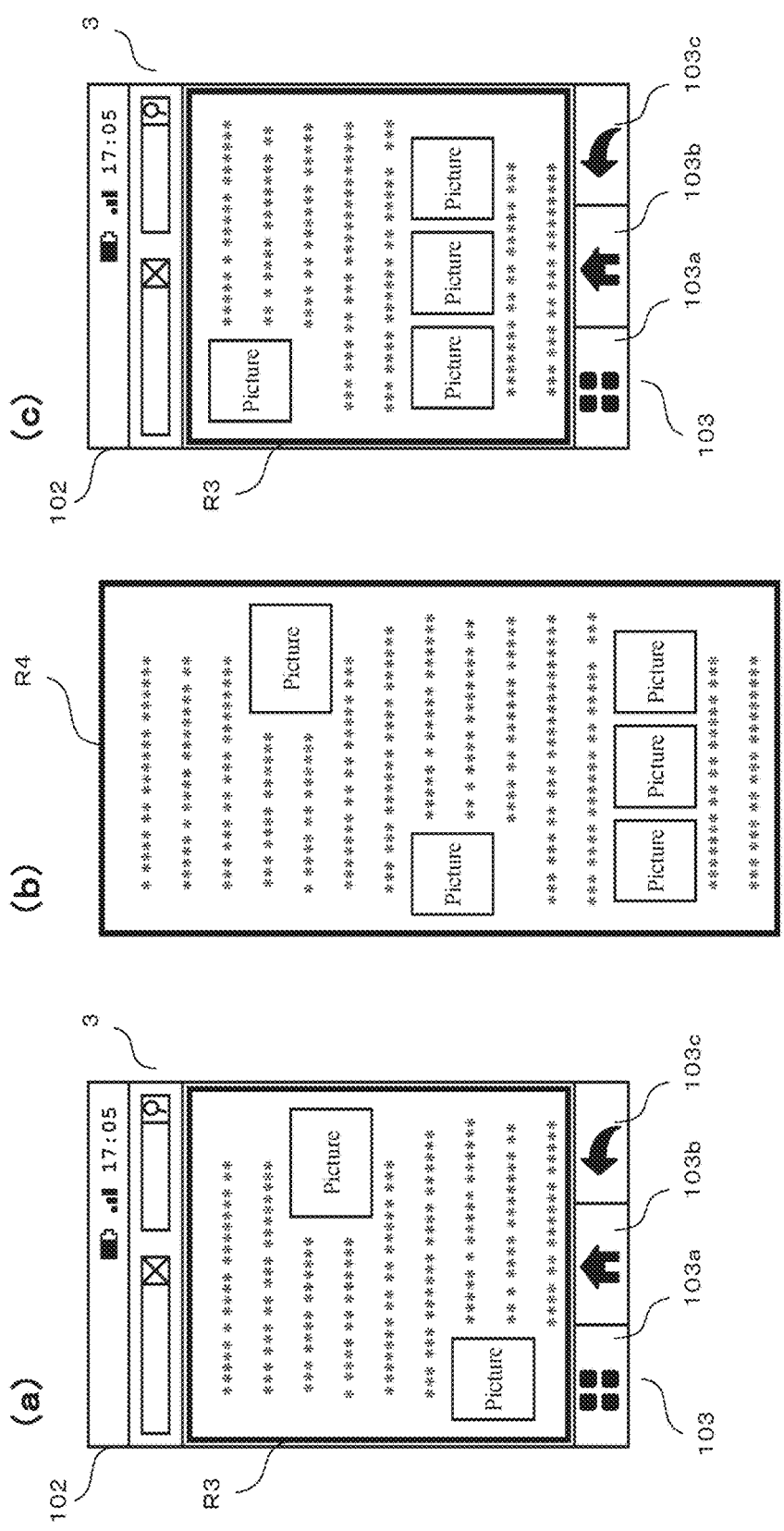
FIG. 4 represents an example in which a web screen including a scrollable web page is displayed on the display.

FIG. 4 represents an example in which a web screen including a scrollable web page is displayed on display 3. For example, as shown in FIGS. 4(*a*) and 4(*b*), a size of screen region R4 required to display an entire web page is larger in the upward/downward direction than a size of screen region R3 allocated to display a web page in the web screen, control module 11 can set screen region R3 in which the web page is displayed to be a scroll region. Screen region R3 which is a scroll region, in other words, the web page displayed in screen region R3 becomes scrollable in the upward/downward direction. It should be noted that, for convenience in description, screen regions R3 and R4 are indicated by bold frames in FIG. 4.

Control module 11 can receive a flick or slide operation in the upward/downward direction with respect to screen region R3 as a scroll operation. When the flick or slide operation in the upward direction is performed, control module 11 can move the web page upward and can display in screen region R3 a lower portion provided before the movement. As shown in FIG. 4(*c*), when screen region R3 is scrolled to an end position, the last portion of the web page is displayed on display 3. Control module 11 does not receive further scroll operation in the direction of moving the web page upward.

It should be noted that, as shown in FIGS. 3 and 4, on an execution screen (a mail browsing screen, a web screen), a notification bar 102 is located in an upper portion, and an operation key group 103 is located in a lower portion. Depending on an application, there is a case where at least one of notification bar 102 and operation key group 103 is not included in the execution screen. Notification bar 102 includes a current time, a residual quantity meter indicating a battery residual quantity, an intensity meter indicating an intensity of an electric wave, and the like. Operation key group 103 includes of a setting key 103*a*, a home key 103*b*, and a back key 103*c*. Setting key 103*a* is a key mainly configured to display a setting screen for various settings on display 3. Home key 103*b* is a key mainly configured to shift a display of display 3 from other screen to a home screen. Back key 103*c* is a key mainly configured to return the executed processing to a previous processing by one step.

It should be noted that, depending on an execution screen, there is a case where an entire region except for notification bar 102 and operation key group 103 becomes a scroll region. Further, when the execution screen does not include notification bar 102 and operation key group 103, there is a case where an entire execution screen becomes a scroll region.

In a conventional mobile phone, in order to suppress power consumption, a display is darkened or turned off when the time period of not performing an operation to a mobile phone exceeds a predetermined time limit.

As shown in FIGS. 3 and 4, when the execution screen includes a scroll region, a user sequentially browses a content (a mail main body, a web page, and the like) displayed in the scroll region while performing the scroll operation. In such a case, although an operation to mobile phone 1 such as a scroll operation or the like is likely to be interrupted, display 3 is desirably not darkened or turned off by the power-saving function described above when a user browses the displayed content.

In mobile phone 1 of the one embodiment, as will be described in the following, control module 11 can execute a power-saving control processing capable of suppressing unintentional darkening or turning off of display 3 when a user browses a displayed content.

FIG. 5(a) is a flowchart representing a processing for controlling a power-saving, and FIG. 5(b) represents a processing for adjusting a time limit included in the power-saving processing.

When the power-saving limit processing is started, control module 11 executes a time limit adjustment processing of adjusting a first time limit (S101). The first time limit is a time limit by which control module 11 lowers a brightness of display 3 when an operation to mobile phone 1 such as a touch operation to display 3, an operation to a hard key, or the like is not performed.

As shown in FIG. 5(b), control module 11 determines whether or not an execution screen currently displayed on display 3 includes a scroll region (S201). When the execution screen does not include the scroll region, the displayed content to be browsed is small. Therefore, the operation is less likely to be interrupted by browsing. Therefore, when control module 11 determines that the execution screen does not include the scroll region (S201:NO), it sets a first time period (for example, 15 seconds) to the first time limit (S202).

On the other hand, as shown in FIGS. 3 and 4, when the execution screen includes the scroll region, and a user is browsing the displayed content, it is desirable not to lower the brightness of display 3 even if some time period is required for the next operation so as not to interrupt the browsing by a user. Therefore, when control module 11 determines that the execution screen includes the scroll region (S201:YES), it determines next whether or not the scroll region is scrolled to an end position (S203).

When the scroll region is not scrolled to the end position, in other words, when the last portion of the displayed content is not displayed on display 3, it is highly possible that a user is browsing the displayed content. Therefore, when control module 11 determines that the scroll region is not scrolled to the end position (S203:NO), it sets a second time period (for example, 30 seconds), which is longer than the first time period, to the first time limit (S204).

On the other hand, when the scroll region is scrolled to the end position, in other words, the last portion of the displayed content is already displayed on display 3, it is highly possible that a user has finished browsing the displayed content. Therefore, when control module 11 determines that the scroll region is scrolled to the end position (S203:YES), it sets the first time period to the first time limit (S202).

It should be noted that, in the time limit adjustment processing of FIG. 5(b), the scroll position at which the last portion of the displayed content is displayed on display 3, and it is determined in Step S203 whether or not the scroll region is scrolled to the end position. However, when a relatively large number of margin regions are present in a lower portion of the scroll region, so that the last portion of the displayed content is displayed on display 3 before the scroll region is scrolled to the end position, a position at which the last portion of the displayed content is displayed on display 3 and a predetermined scroll position prior to the end position may be used for the determination in Step S203.

In such a manner, when the first time period or second time period is set for the first time limit, control module 11 operates a timer and measures a time (S102). For example, the timer is included in control module 11. Control module 11 determines whether or not an operation to mobile phone 1 is performed before the first time limit has passed (S103, S104). When an operation is performed before the first time limit has passed (S103:YES), control module 11 resets the timer (S105). Returning to the processing of Step S101, control module 11 executes the time limit adjustment processing again. While the next operation is performed until the first time limit is passed, the processing from Step S101 to Step S105 are repeated.

On the other hand, when the first time limit has passed while the operation to mobile phone 1 is not performed (S103:NO→S104:YES), control module 11 lowers the brightness of display 3 (S106).

As described above, the time limit adjustment processing of Step S101 is executed, so that the first time limit is set to be the second time period which is longer than the first time period when it is highly possible that a user is browsing the displayed content. Therefore, during the browsing, even when the operation to mobile phone 1 is likely to be interrupted, the brightness of display 3 is less likely to be lowered.

When the brightness of display 3 is lowered, control module 11 resets the timer and operates the timer again (S107). Control module 11 determines whether or not an operation to mobile phone 1 is performed before the second time limit (for example, 10 seconds) has passed from lowering of the brightness of display 3 (S108, S109). When the operation is performed before the second time limit has passed (S108:YES), control module 11 recovers the brightness of display 3 to an original state (S110) and resets the timer (S111). Then, returning to the processing of Step S101, control module 11 executes the time limit adjustment processing again.

On the other hand, when the second time limit has passed while the operation to mobile phone 1 is not performed (S108:NO→S109:YES), control module 11 turns off display 3 (S112). Then, control module 11 resets the timer (S113) and terminates the power-saving control processing.

In mobile phone 1 of one embodiment, control module 11 can turn off display 3 and concurrently can set a lock function. When the lock function is set, control module 11 can invalidate the operation to mobile phone 1. However, control module 11 can validate a display operation for displaying on display 3 a releasing screen of the lock function (for example, an operation to a predetermined hard key) and a releasing operation for releasing the lock function to the releasing screen. When the releasing operation is performed, control module 11 can release the lock function and can allow display 3 to display the execution screen which has been displayed before turning off. When the releasing screen is displayed on display 3 by a display operation, the power-saving control processing is started again.

As described above, according to one embodiment, when the execution screen includes a scroll region, and the scroll region is not scrolled to a state where the last portion of the displayed content is displayed on display 3, the first time limit is set to be longer as compared to the case where the execution screen does not include the scroll region. Accordingly, the possibility of unintentionally darkening display 3 while a user is browsing the displayed content is lowered. Therefore, a user's convenience can be improved.

Further, according to the above-described embodiment, when the last portion of the displayed content is scrolled to the state where the last portion of the displayed content is displayed on display 3, the first time limit is set to be shorter as compared to the opposite case. Accordingly, when a user terminates browsing the displayed content and quit using mobile phone 1, display 3 can be darkened in an early stage.

Thus, according to one embodiment, improvement in the convenience for a user and reduction of the power consumption can be favorably achieved.

In the above, the embodiment of the present disclosure was described. However, the present disclosure is not limited by the above-described embodiment, and the embodiment of the present disclosure can be modified in various ways other than those described above.

Modified Example 1

Figure 6:
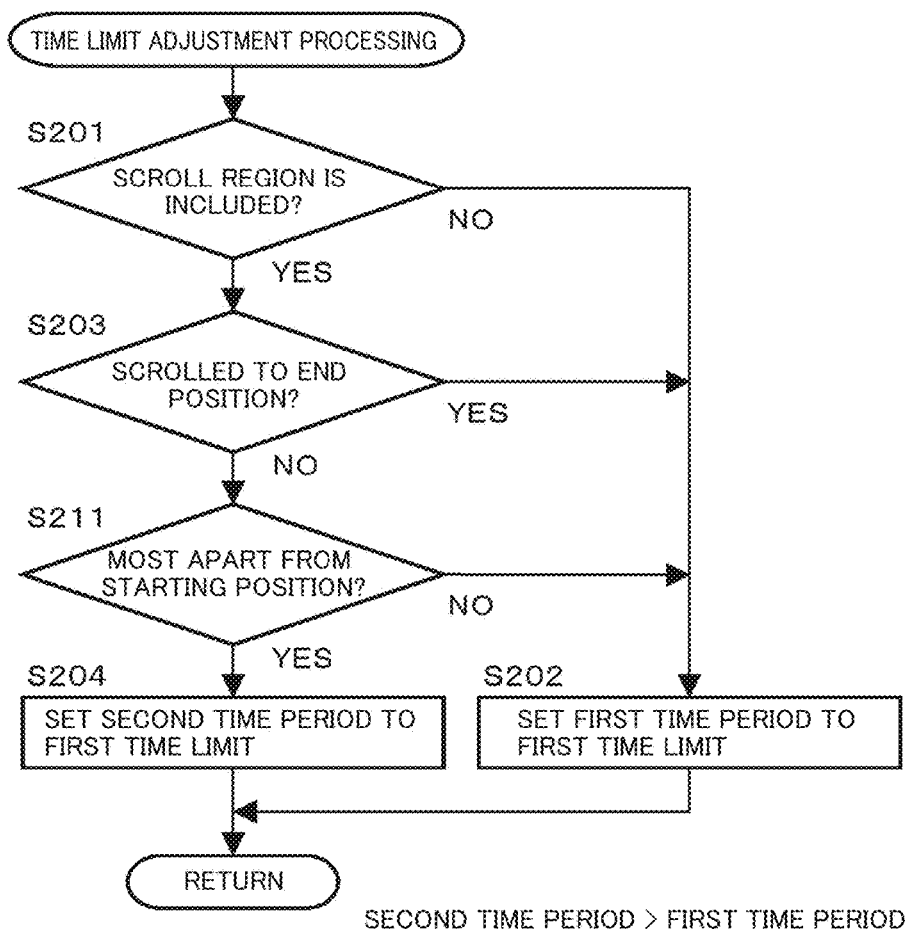
FIG. 6 is a flowchart representing a time limit adjustment processing.

FIG. 6 is a flowchart representing a time limit adjustment processing according to a modified example 1.

In the present modified example, a determination processing of Step S211 is added to the time limit adjustment processing of FIG. 5(*b*). In other words, when control module 11 determines that a scroll region is not scrolled to an end position (S203:NO), it determines next whether or not a current scroll position of the scroll region is most apart from a starting position after starting scrolling (S211).

For example, when the scrolling of the scroll region is started after an execution screen is displayed, control module 11 detects a scroll position at each time when a scroll operation is ended. When mobile phone 1 is configured to have a value of a scroll position which becomes greater as leaving apart from the starting position, control module 11 stores a maximum scroll position to memory module 12 at each time when the scroll position becomes maximum. When the current scroll position is equal to or greater than the maximum scroll position stored in memory module 12, control module 11 determines that the current scroll position of the scroll region is most apart from the starting position after the scrolling is started.

When the current scroll position is most apart from the starting position, it is highly possible that a user goes on reading the displayed content of the scroll region, in other words, browsing of the displayed content is continued. Therefore, when control module 11 determines that the current scroll position is most apart from the starting position (S211:YES), it sets the second time period to the first time limit (S204).

On the other hand, when the current scroll position is not most apart from the starting position, it can be considered that a user has finished browsing the desired area and returned the displayed content. In this case, it is highly possible that a user has not browsed. Therefore, when control module 11 determines that the current scroll position is not most apart from the starting position (S211:NO), it sets the first time period to the first time limit (S202).

According to the present modified example, the determination on whether or not a user has finished browsing the displayed content can be performed more in detail, so that the power consumption can be further suppressed.

Modified Example 2

FIG. 7(*a*) is a flowchart representing a time limit adjustment processing according to a modified example 2.

In the present modified example, the processing of Steps S221 to S224 are added to the time limit adjustment processing of FIG. 5(*b*). When control module 11 determines that an execution screen includes a scroll region (S201:YES), it next controls image capturing module 21 to operate in-camera 8 (S221). Control module 11 performs a face detection processing (S222) to determine whether or not a face is captured by in-camera 8 (S223).

In-camera 8 can capture a face of a user oriented to mobile phone 1 (display 3). When a uses mobile phone 1, a face is captured by in-camera 8. Therefore, when control module 11 determines that a face is captured by in-camera 8 (S223:YES), it proceeds to the processing of Step S203, and sets the first time period or second time period to the first time limit in accordance with a determination on whether or not a scroll region is scrolled to an end position (S202, S204).

On the other hand, when a face is not captured by in-camera 8, it is highly possible that a user is not using mobile phone 1. Therefore, when control module 11 determines that a face is not captured by in-camera 8 (S223:NO), it sets the first time period to the first time limit (S202).

When the first time limit is set, control module 11 stops in-camera 8 (S224) and terminates the time limit adjustment processing.

According to the present modified example, when a face is not captured by in-camera 8, the first time limit is not set to be the second time period regardless of whether or not the scroll region is scrolled to an end position. Therefore, it can prevent maintaining the normal brightness of display 3 for a long time even though mobile phone 1 is not use, and the power consumption can be further suppressed.

Modified Example 3

FIG. 7(*b*) is a flowchart representing a time limit adjustment processing according to a modified example 3.

In the present modified example, the processing of Steps S231 and S232 are added to the time limit adjustment processing of FIG. 5(*b*). When control module 11 determines that an execution screen includes a scroll region (S201:YES), it next detects an orientation of mobile phone 1 by means of orientation detection module 22 (S231) to determine whether or not mobile phone 1 is retained in a horizontal state (S232).

A user often uses mobile 1 by holding it in his hand. In this case, a user often tilts mobile phone 1 so as to readily see display 3. Therefore, when mobile phone 1 is not retained in a horizontal state, it is highly possible that mobile phone 1 is used by a user. When control module 11 determines that mobile phone 1 is not held in a horizontal state (S232:NO), it proceeds to the processing of Step S203 and sets the first time period or second time period as the first time limit in accordance with whether or not the scroll region is scrolled to the end position (S202, S204).

On the other hand, when a user is not using mobile phone 1, and mobile phone 1 is in a state of being placed on a desk or the like, mobile phone 1 is retained in a horizontal state. Therefore, when mobile phone 1 is retained in a horizontal state, it is highly possible that mobile phone 1 is not used by a user. When control module 11 determines that mobile phone 1 is retained in a horizontal state (S232:YES), it sets the first time period to the first time limit (S202).

According to the present modified example, when mobile phone 1 is in a horizontal state, the first time limit is not set to be the second time period regardless of whether or not the scroll region is scrolled to the end position. Therefore, it can prevent maintaining the normal brightness of display 3 for a long time even though mobile phone 1 is not use, and the power consumption can be further suppressed.

Modified Example 4

In the above-described embodiment, when it is highly possible that a user is browsing the displayed content of the scroll region, the first time limit is set to be long. In the present modified example, when it is highly possible that a user is browsing the displayed content of the scroll region, the darkening of display 3 based on the first time limit is not performed.

Figure 8:
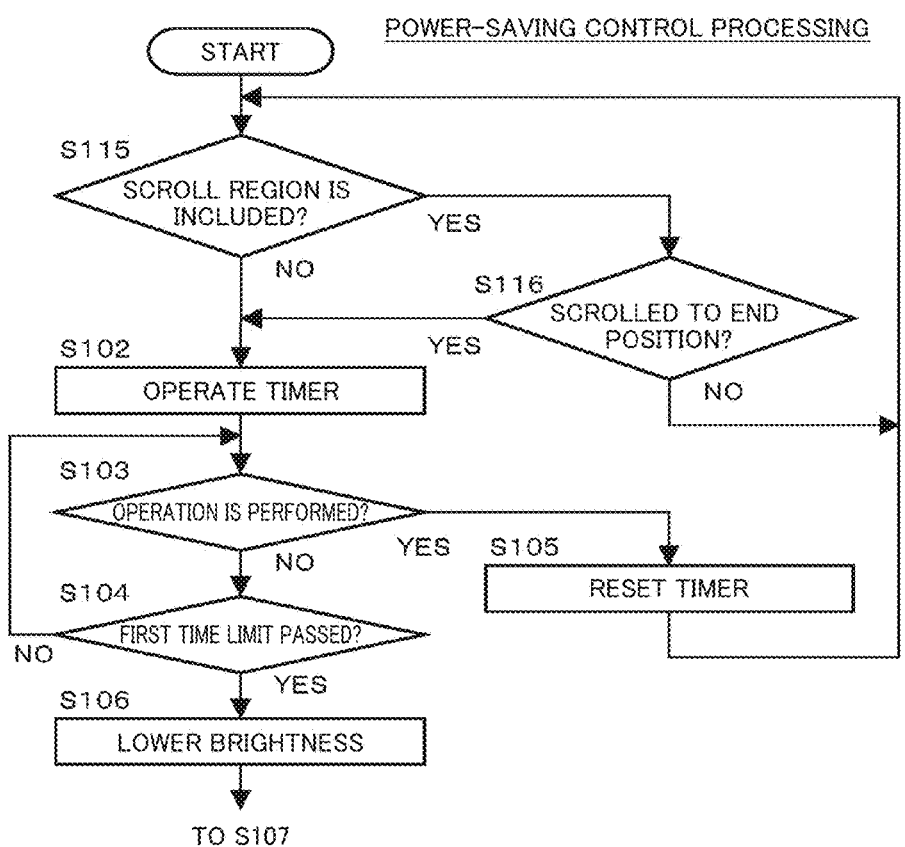
FIG. 8 is a flowchart representing a power-saving control processing.

FIG. 8 is a flowchart representing a power-saving control processing according to a modified example 4.

In the present modified example, the processing of Step S101 in the power-saving control processing of FIG. 5(a) is replaced with the processing of Steps S115 and S116. Moreover, at the time of starting the power-saving control processing, a predetermined time period (for example, a time period which is equal to the first time period) is set to the first time limit. It should be noted that, in FIG. 8, for convenience, the processing subsequent to Step S107 which are the same as the power-saving control processing of FIG. 5(a) are omitted.

When the power-saving control processing is started, control module 11 determines whether or not an execution screen includes a scroll region (S115). When the execution screen does not include the scroll region (S115:NO), control module 11 operates a timer (S102). When the first time limit has passed without an operation to mobile phone 1 (S103:NO→S104:YES), the brightness of display 3 is lowered (S106).

When the execution screen includes the scroll region (S115:YES), control module 11 determines whether or not the scroll region is scrolled to the end position (S116). When control module 11 determines that the scroll region is scrolled to the end position (S116:YES), it proceeds to the processing of Step S102 and operates the timer.

On the other hand, when control module 11 determines that the scroll region is not scrolled to the end position (S116:NO), it returns to the processing of Step S115. In such a manner, when the execution screen includes the scroll region, and the scroll region is not scrolled to the end position, the processing of Steps S115 and S116 are repeated, and the processing is not proceeded to the processing of Step S102. Therefore, the darkening of display 3 based on the passing of the first time limit is not performed.

According to the present modified example, as with the above-described embodiment, the possibility of unintentionally darkening display 3 while a user is browsing the displayed content becomes low. Further, when a user terminates browsing the displayed content and stops using mobile phone 1, display 3 can be darkened in an early stage. Thus, the improvement in the convenience for a user and the reduction of the power consumption can be achieved.

Modified Example 5

Figure 9:
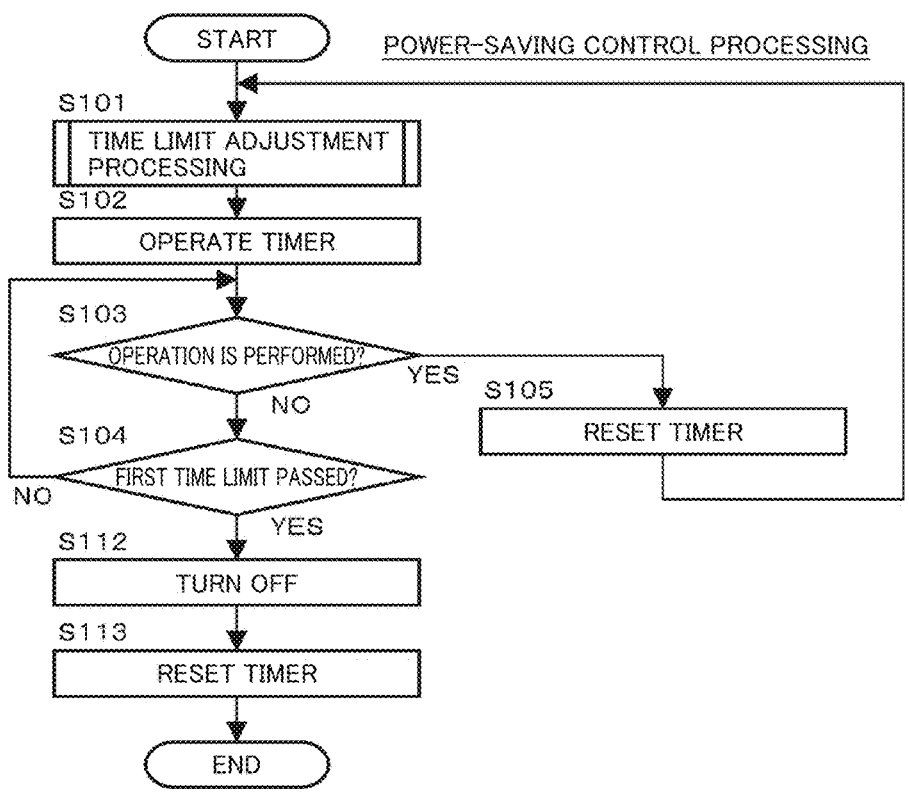
FIG. 9 is a flowchart representing a power-saving control processing.

FIG. 9 is a flowchart representing a power-saving control processing according to a modified example 5.

In the above-described embodiment, when the first time limit has passed without performing the next operation, display 3 is darkened. When the second time limit has passed without performing an operation, display 3 is turned off. However, as can be seen in the present modified example, when the first time limit has passed, display 3 may be turned off immediately without darkening.

In the present modified example, the processing of Steps S106 to S111 in FIG. 5(a) are removed, and the processing of Step S112 is executed subsequent to the processing of Step S104. When control module 11 determines that the first time limit has passed without performing an operation to mobile phone 1 (S103:NO→S104:YES), it turns off display 3 (S112). After that, control module 11 resets the timer (S113) and terminates the power-saving control processing.

According to the present modified example, the possibility of unintentionally turning off display 3 while a user is browsing the displayed content becomes low. Further, when a user terminates browsing the displayed content and stops using mobile phone 1, display 3 can be turned off in an early stage. Thus, the improvement in convenience of a user and the reduction of the power consumption can be favorably achieved.

Modified Example 6

In the present modified example, control module 11 executes an advance informing processing concurrently with the power-saving control processing.

Figure 10:
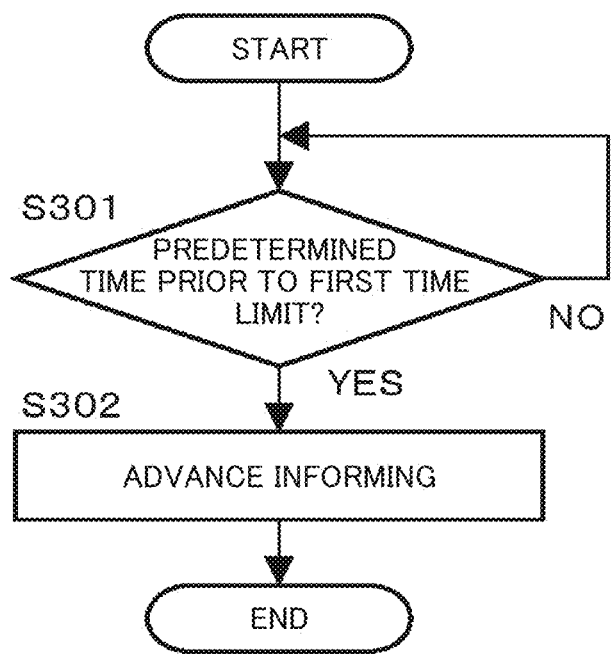
FIG. 10 is a flowchart representing an advance informing processing.

FIG. 10 is a flowchart representing an advance informing processing according to a modified example 6. The advance informing processing is started at each time when the timer is operated.

When the advance informing processing is started, control module 11 monitors whether or not a measuring time of the timer is at a predetermined time (for example, 5 seconds) prior to the first time limit (S301). When the measuring time is at the predetermined time prior to the first time limit (S301:YES), control module 11 performs an advance informing (S302). For example, control module 11 controls voice output module 16 to output an informing sound from external speaker 7. Alternatively, control module 11 controls vibration generating module 20 to vibrate the vibrator and in turn vibrate cabinet 2.

According to the present modified example, the advance informing is performed with respect to a user before display 3 is darkened. Therefore, a user can perform a predetermined operation to avoid darkening of display 3.

Modified Example 7

In the present modified example, a user can set an application (hereinafter, referred to as an "adjusted application") which is set to have a long first time limit when an execution screen includes a scroll region. In the present modified example, control module 11 executes a user setting processing.

Figure 11:
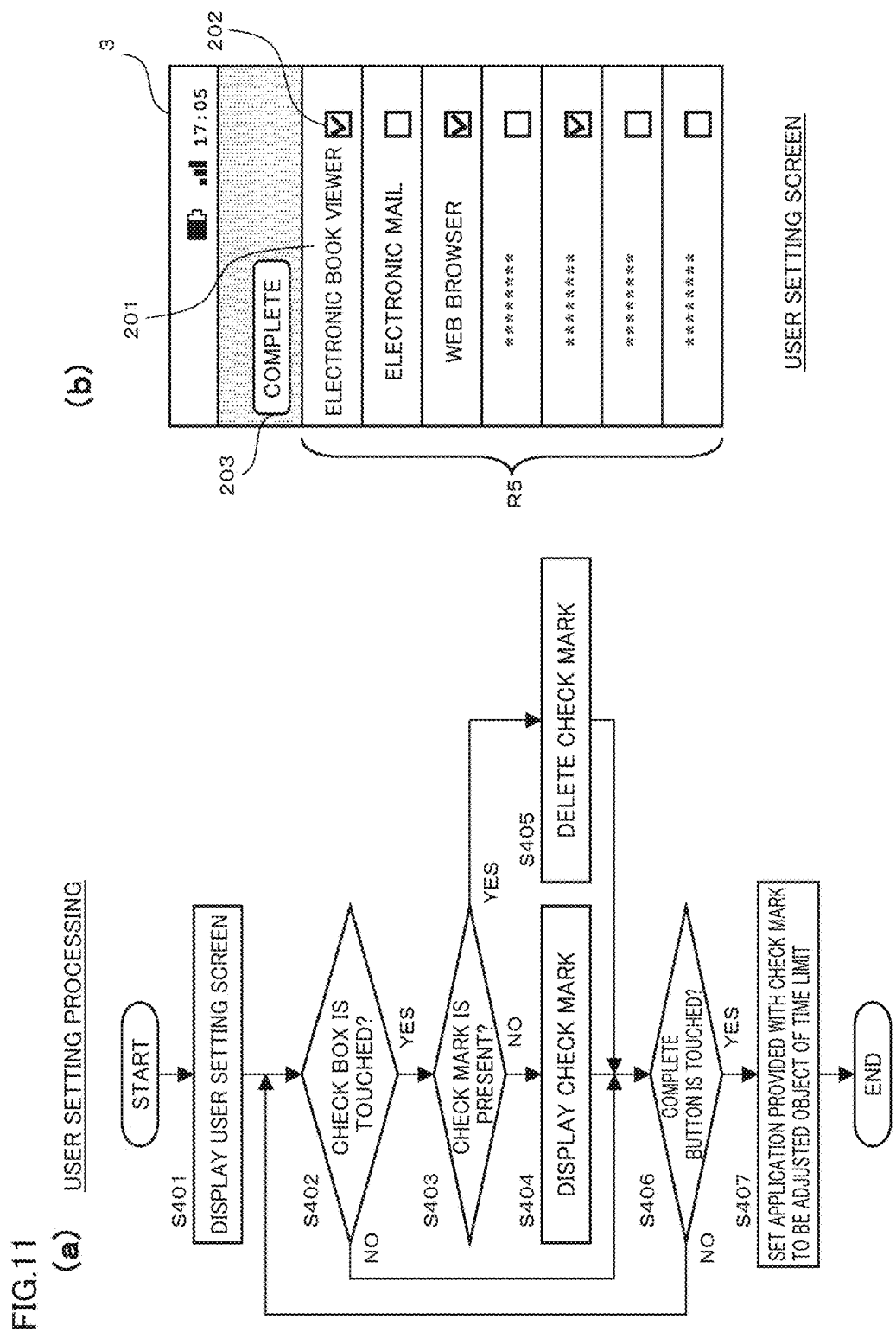
FIG. 11 illustrates a user setting processing.

FIG. 11(a) is a flowchart representing a user setting processing according to a modified example 7. FIG. 11(b)

represents one example of a user setting screen displayed on display 3 in the user setting processing according to modified example 7.

When a user performs an operation to set an adjusted application, the user setting processing is started. Control module 11 displays a user setting screen on display 3 (S401). For example, as shown in FIG. 11(b), in the user setting screen, a list of applications installed in mobile phone 1 is displayed in a list display region R5. When a flick operation in an upward direction or a downward direction is performed with respect to list display region R5, list display region R5 is scrolled, so that applications which have not been displayed are displayed.

In display region 201 of each application, a check box 202 is provided next to a name of an application. A check mark is displayed at check box 202 of an application which is currently set as an adjusted object. Further, in the user setting screen, a complete button 203 is arranged in an upper portion of list display region R5.

When a user sets an application which is not set as an adjusted object to be an adjusted object, he touches check box 202 of a desired application. A check mark is not originally displayed at this check box 202. Moreover, when a user excludes an application which is set as an adjusted object from the adjusted object, he touches check box 202 of a desired application. A check mark is originally displayed at this check box 202.

When check box 202 of any application is touched (S402:YES), control module 11 determines whether or not a check mark is displayed at touched check box 202 (S403). When a check mark is not displayed at check box 202 (S403:NO), control module 11 displays a check mark (S404). When a check mark is displayed at check box 20 (S403:YES), control module 11 deletes the check mark (S405).

Control module 11 repeatedly executes the processing of Steps S402 to S405 until complete button 203 is touched (S406:NO). When complete button 203 is touched (S406:YES), control module 11 sets an application having a check mark at check box 202 to be an object for which the time limit is adjusted (S407). After that, control module 11 closes the user setting screen and terminates the user setting processing.

Figure 12:
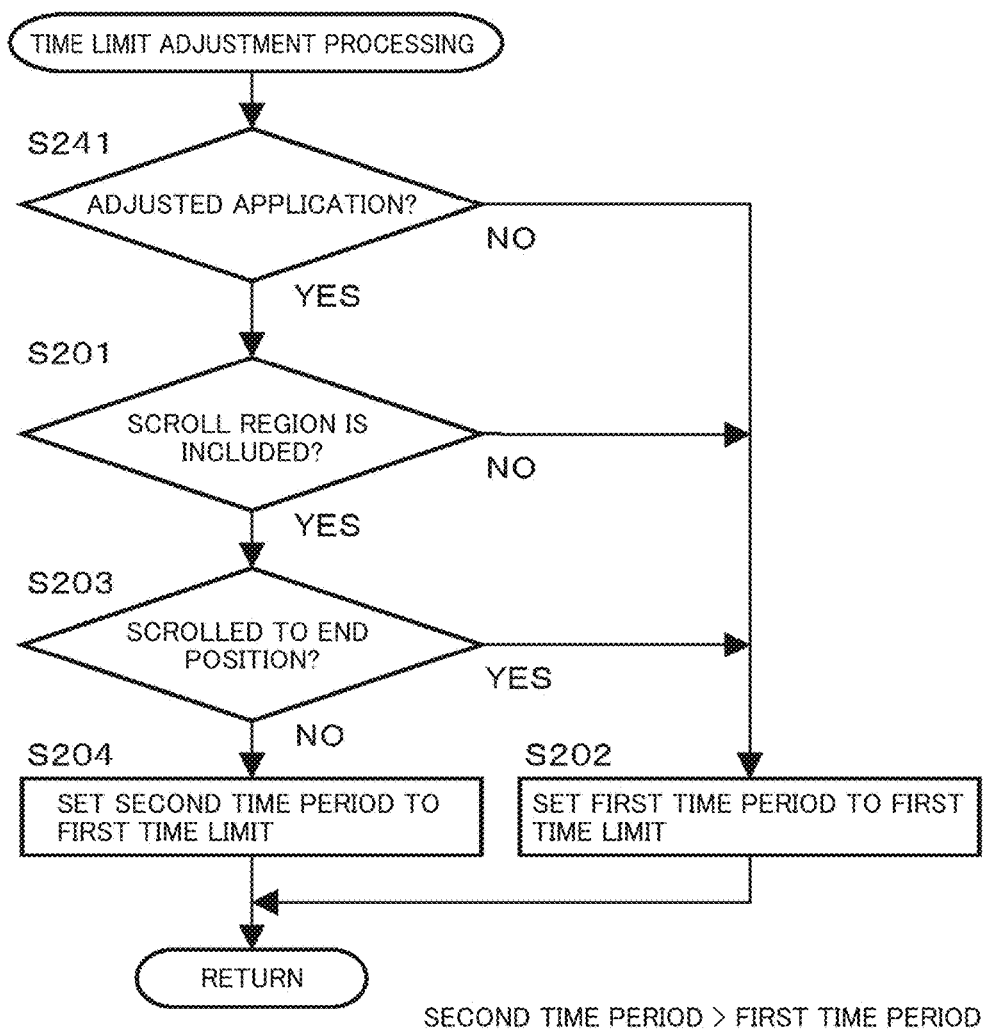
FIG. 12 is a flowchart representing a time limit adjustment processing.

FIG. 12 is a flowchart representing a time limit adjustment processing according to a modified example 7.

In the present modified example, the processing of Step S241 is added to the time limit adjustment processing of FIG. 5(b). When the time limit adjustment processing is started, control module 11 determines whether or not an execution screen displayed on display 3 is an execution screen related to an adjusted application set by the user setting processing (S241). When the execution screen displayed on display 3 is the execution screen related to the adjusted application (S241:YES), control module 11 proceeds to the processing of Step 201. When the execution screen includes a scroll region, and the scroll region is not scrolled to the end position (S201:YES→S203:NO), control module 11 sets the second time period to the first time limit (S204).

On the other hand, when the execution screen displayed on display 3 is not an execution screen related to an adjusted application (S241:NO), control module 11 sets the first time period to the first time limit (S202).

According to the present modified example, in a state where it is highly possible that a user is browsing the application which is considered by a user as necessary, the time to darken display 3 during non operation can be extended.

Other Modified Example

The configurations of the above-described modified examples 1 to 7 can be combined appropriately.

Figure 13:
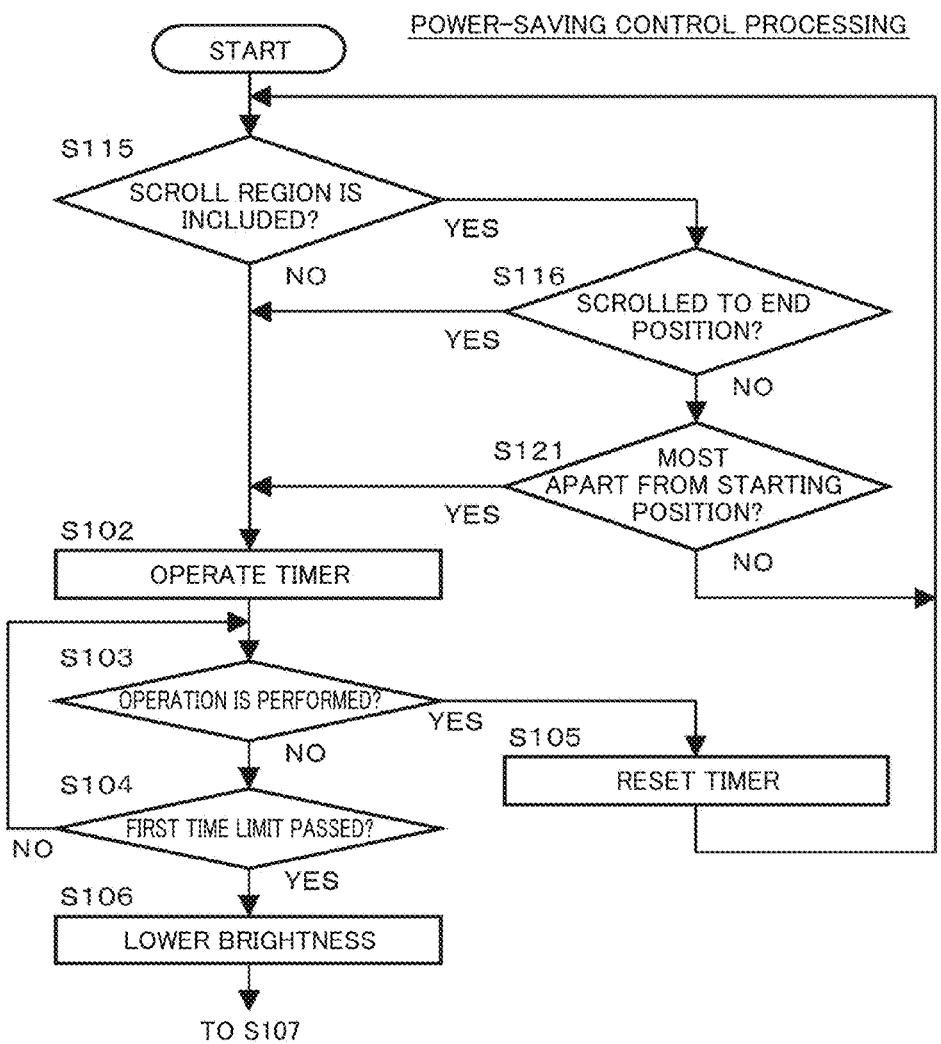
FIG. 13 is a flowchart representing a power-saving control processing.

For example, as shown in FIG. 13, when the configuration of modified example 1 is applied to the configuration of modified example 4, and control module 11 determines that the scroll region is not scrolled to the end position (S116:NO), control module 11 further determines whether or not the current scroll position of the scroll region is most apart from the starting position after starting the scrolling (S121). When the current scroll position is most apart from the starting position (S121:YES), control module 11 operates the timer (S102). On the other hand, when the current scroll position is not most apart from the starting position (S121:NO), the process returns to Step S115, and control module 11 does not operate the timer.

Moreover, as shown in FIG. 14(a), when the configuration of modified example 2 is applied to the configuration of modified example 4, and control module 11 determines that the execution screen includes the scroll region (S115:YES), control module 11 next controls image capturing module 21 to operate in-camera 8 (S131). Control module 11 performs a face detection processing (S132) to determine whether or not a face is captured by in-camera 8 (S133). When a face is not captured by in-camera 8 (S133:NO), control module 11 operates the timer (S102). On the other hand, when a face is captured by in-camera 8 (S133:YES), control module 11 determines whether or not the scroll region is scrolled to the end position (S116).

Further, as shown in FIG. 14, when the configuration of modified example 3 is applied to the configuration of modified example 4, and control module 11 determines that the execution screen is included in the scroll region (S115:YES), control module 11 next detects an orientation of mobile phone 1 by means of orientation detection module 22 (S141) to determine whether or not mobile phone 1 is retained in a horizontal state (S142). When mobile phone 1 is retained in a horizontal state (S142:YES), control module 11 operates the timer (S102). On the other hand, when mobile phone 1 is not retained in a horizontal state (S142:NO), control module 11 determines whether or not the scroll region is scrolled to the end position (S116).

Further, when the configuration of modified example 5 is applied to the configuration of modified example 4, the processing of Steps S106 to S111 of the power-saving control processing shown in FIG. 8 are removed, and the processing of Step S112 is executed subsequent to the processing of Step S104. It should be noted that, in FIG. 8, the processing subsequent to Step S107 are omitted.

In the time limit adjustment processing of the above-described embodiment, when the scroll region is scrolled to the end position, the first time period is set to the first time limit. However, when the execution screen includes the scroll region, and the scroll region is scrolled to the end position, there is a higher possibility that the displayed content in the execution screen is being read by a user as compared to the case where the execution screen does not include the scroll region. Therefore, when the scroll region is scrolled to the end position, a third time period which is shorter than the second time period and longer than the first time period may be set in place of the first time period to the first time limit.

In the above-described modified example 2, the face detection with use of in-camera 8 is used to perform a determination on whether or not it is highly possible that a user uses mobile phone 1. Moreover, in the above-described modified example 3, the detection of an orientation of mobile phone 1 is used to perform a determination on whether or not it is highly possible that a user uses mobile phone 1. As with above-described modified example 2 and modified example 3, an illuminance sensor may be used to perform a detection on whether or not it is highly possible that a user uses mobile phone 1.

Figure 15:
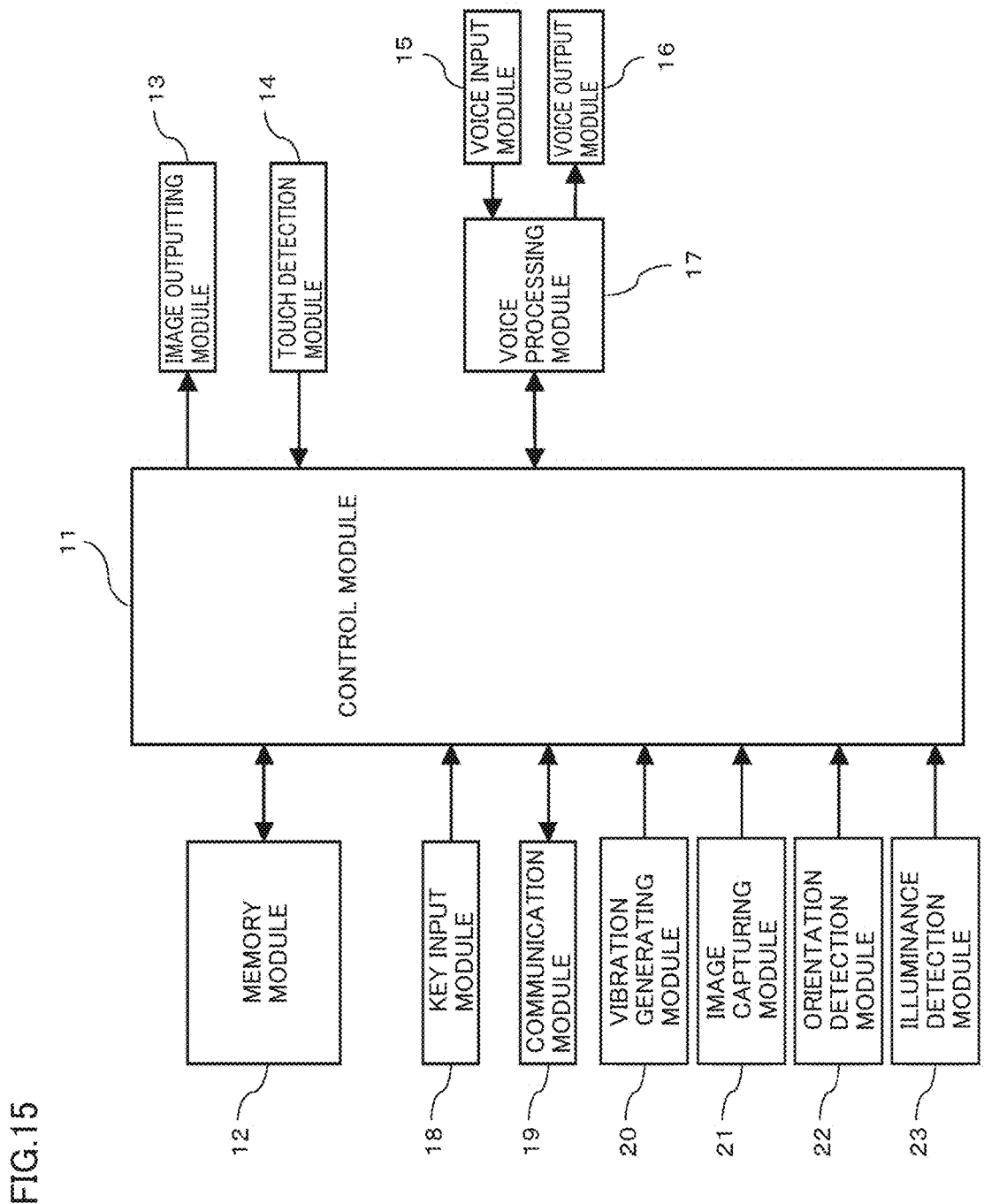
FIG. 15 is a block diagram representing an overall configuration of the mobile phone.

As shown in FIG. 15, mobile phone 1 includes an illuminance detection module 23 in addition to the configuration of the above-described embodiment. Illuminance detection module 23 includes an illuminance sensor, and it can detect a brightness around mobile phone 1 by means of the illuminance sensor and output a detection signal in accordance with the detected illuminance to control module 11. Although it is not illustrated, for example, the illuminance sensor is located on the right side of phone call speaker 6 so that its sensing module is exposed to outside.

As shown in FIG. 16, when the execution screen includes the scroll region (S201:YES), control module 11 detects an illuminace by means of illuminance detection module 23 (S241). Control module 11 compares a detected illuminance for this time with a detected illuminance for a previous time stored in memory module 12 to determine whether or not the illuminance decreases more than a predetermined quantity (S242). For example, a change in an illuminace is measured which occurs when mobile phone 1 is put into a bag or the like during an examination, and the predetermined quantity is determined based on a measured value.

When a user stops using mobile phone 1 and puts mobile phone 1 into a pocket or a bag, the periphery of mobile phone 1 is rapidly darkened, so that the illuminance decreases significantly. When control module 11 determines that the illuminance decreases more than the predetermined quantity (S242:YES), it sets the first time period to the first time limit regardless of whether or not the scroll region is scrolled to the end position (S202). Control module 11 stores the illuminance for this time into memory module 12 (S243) and terminates the time limit adjustment processing.

It should be noted that, when the detection of the illuminance is the first time, and a previously detected illuminance is not stored in memory module 12, control module 11 determines in Step S242 that the illuminance is not lowered to be significantly smaller than the predetermined quantity.

With such a configuration, as with the above-described modified example 2 and modified example 3, it can prevent maintaining the normal brightness of display 3 for a long time even though mobile phone 1 is not use, and the power consumption can be further suppressed.

It should be noted that, the configuration of the present modified example can be combined appropriately with the configurations of modified examples 1 to 7.

In the above-described embodiment, the second time limit is not adjusted. However, when the first time limit is set to be a long time (second time period), the second time limit may also be set to be a long time.

In the configuration of the above-described modified example 2, as shown in FIG. 7(*a*), when a face is captured by in-camera 8, it is determined whether or not the scroll position is at the end position. However, the determination on whether or not the scroll position is at the end position may be removed. In this case, when the screen displayed on display 3 includes the scroll region, and a face is captured by in-camera 8, control module 11 sets the second time period to the first time limit regardless of the scroll position.

Similarly, also in the configuration of FIG. 14(*a*), the determination on whether or not the scroll position is at the end position may be removed. In this case, when the screen displayed on display 3 includes the scroll region, and a face is captured by in-camera 8, control module 11 does not operate the timer and does not perform the darkening based on the first time limit regardless of the scroll position.

In the above-described embodiment, the present disclosure is applied to a mobile phone of a smart phone type. However, not limited to this, the present disclosure may be applied to mobile phones of other types such as a slate type, a folding type, a sliding type, or the like.

Further, not limited to mobile phones, the present disclosure can be applied to various electronic device such as a personal computer, a PDA (Personal Digital Assistant), a tablet PC, a music player, a navigation system, an electronic book terminal, or the like.

Other than those, the embodiment of the present disclosure can be modified in various ways appropriately within the scope of the technical idea recited in claims.

Although the present disclosure has been described and illustrated in detail, it is clearly understood that the same is by way of illustration and example only and is not to be taken by way of limitation, the scope of the present invention being interpreted by the terms of the appended claims.

The invention claimed is:

1. An electronic device, comprising:
    a display;
    a memory module;
    a controller communicatively coupled with the memory module, wherein the controller is programmed to darken or turn off the display based on an event that a time period of not receiving an operation exceeds a time limit by:
    when a screen displayed on the display includes a scrollable region and the scrollable region is scrolled to a scroll position prior to an end position, where a last portion of a displayed content in the scrollable region is displayed on the display and the controller does not receive further scroll operation in a direction of moving the displayed content upward, executing a first control of setting the time limit to be longer as compared to a case where the screen does not include the scrollable region or not darkening or turning off the display based on the time limit,
    when the screen includes the scrollable region, and the scrollable region is scrolled to the end position, executing a second control of setting the time limit to be shorter as compared to the first control or darkening or turning off the display based on the time limit.

2. The electronic device according to claim 1,
    wherein the controller performs an informing operation before an elapse of the time limit.

3. The electronic device according to claim 1, wherein the controller sets an application selected from a plurality of applications to be an adjusted object subjected to the first control or the second control, and
    when the screen including the scrollable region is a screen related to an application set to be the adjusted object, the controller performs the first control or the second control.

* * * * *